(12) United States Patent
Tepper et al.

(10) Patent No.: US 10,737,635 B2
(45) Date of Patent: Aug. 11, 2020

(54) AGRICULTURAL WORKING MACHINE

(71) Applicant: CLAAS Selbstfahrende Erntemaschinen GmbH, Harsewinkel (DE)

(72) Inventors: Andreas Tepper, Warendorf (DE); Bernd Kleffmann, Harsewinkel (DE); Udo Heidecker, Bad Iburg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 97 days.

(21) Appl. No.: 16/045,344

(22) Filed: Jul. 25, 2018

(65) Prior Publication Data

US 2019/0077331 A1 Mar. 14, 2019

(30) Foreign Application Priority Data

Sep. 8, 2017 (DE) .................. 10 2017 120 792

(51) Int. Cl.
| | |
|---|---|
| *E04G 3/00* | (2006.01) |
| *B60R 11/02* | (2006.01) |
| *A01D 67/04* | (2006.01) |
| *A01D 41/12* | (2006.01) |
| *B60R 11/00* | (2006.01) |
| *F16M 11/04* | (2006.01) |

(Continued)

(52) U.S. Cl.
CPC .......... *B60R 11/0235* (2013.01); *A01D 41/12* (2013.01); *A01D 67/04* (2013.01); *B60R 2011/0012* (2013.01); *B60R 2011/0073* (2013.01); *B60R 2011/0078* (2013.01); *B60R 2011/0084* (2013.01); *B60R 2011/0087* (2013.01); *B60R 2011/0089* (2013.01); *B60Y 2200/22* (2013.01); *F16M 11/046* (2013.01); *F16M 11/14* (2013.01); *F16M 11/2064* (2013.01)

(58) Field of Classification Search
CPC ... A01D 41/12; B60R 11/0235; F16M 11/046
USPC .................................................. 248/292.14
See application file for complete search history.

(56) References Cited

U.S. PATENT DOCUMENTS

| | | |
|---|---|---|
| 4,854,538 A | 8/1989 | Von Schalscha |
| 6,039,141 A | 3/2000 | Denny |

(Continued)

FOREIGN PATENT DOCUMENTS

| | | |
|---|---|---|
| EP | 2211081 A1 | 7/2010 |
| EP | 2211081 B1 | 9/2011 |
| WO | WO9605081 A1 | 2/1996 |

OTHER PUBLICATIONS

European Search Report for European Patent Application No. 18179252.4-1006 dated Jan. 15, 2019.

*Primary Examiner* — Todd M Epps
(74) *Attorney, Agent, or Firm* — Lempia Summerfield Katz LLC

(57) ABSTRACT

An agricultural working machine with a seat for an operator of the agricultural working machine, with a monitor for displaying data, such as operating data of the agricultural working machine, and/or an attachment of the agricultural working machine, and with an adjustable holding device that holds the monitor. The adjustable holding device enables adjustment of the height, tilt, and distance of the monitor relative to the seat.

18 Claims, 3 Drawing Sheets

(51) Int. Cl.
  *F16M 11/14* (2006.01)
  *F16M 11/20* (2006.01)

(56) References Cited

U.S. PATENT DOCUMENTS

| | | | |
|---|---|---|---|
| 8,430,370 B2 * | 4/2013 | Steege | ................ B60R 11/0235 |
| | | | 248/292.14 |
| 10,434,914 B2 * | 10/2019 | Bittner | .................... B60N 2/79 |
| 2003/0057749 A1 | 3/2003 | Buono | |
| 2003/0230447 A1 | 12/2003 | Wulfert | |
| 2007/0145219 A1 | 6/2007 | Lin | |
| 2010/0181452 A1 | 7/2010 | Steege | |
| 2019/0152360 A1 * | 5/2019 | Brooks | .................... B60N 2/12 |

* cited by examiner

AGRICULTURAL WORKING MACHINE

CROSS REFERENCE TO RELATED APPLICATION

This application claims priority under 35 U.S.C. § 119 to German Patent Application No. DE 102017120792.9, filed Sep. 8, 2017, the entire disclosure of which is hereby incorporated herein by reference.

TECHNICAL FIELD

The technical field relates to an agricultural working machine. More specifically, the technical field relates to an electronic interface for an agricultural working machine.

BACKGROUND

There are a variety of types of agricultural working machines. Example agricultural working machines include, without limitation, agricultural prime movers, such as tractors, or agricultural harvesting machines, such as combines or forage harvesters. These agricultural working machines generally have a seat for an operator of the respective agricultural working machine, and a monitor for displaying operating data of the respective agricultural working machine. EP 2 211 081 B1 describes, for example, an armrest for a seat of an agricultural working machine on which a monitor is arranged for displaying operating data. The monitor is held by a holding device that allows the monitor to be tilted on two axes. In this way, dependent on the given light conditions, the monitor can be pivoted so as not to blind the operator.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
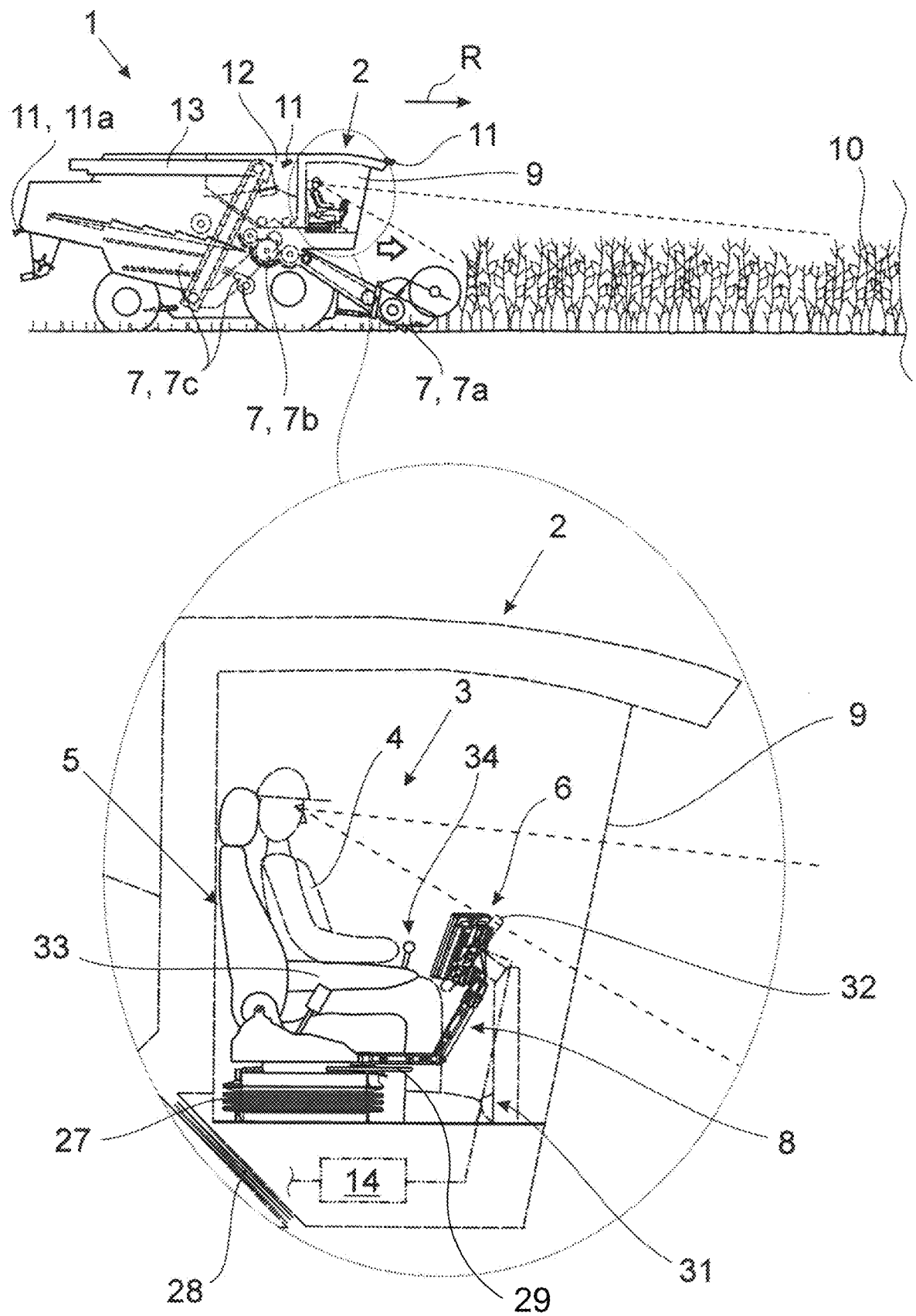
FIG. 1 illustrates a schematic of one implementation of the agricultural working machine with a more detailed view of the driver's cab.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, EP 2 211 081 B1 describes an armrest on which a monitor, tilted on two axes, is arranged. However, the arrangement disclosed by the holding device in EP 2 211 081 B1 only permits restricted and limited adaptation to the operator ergonomics, with adjustments only tilting forward and backward and left and right.

In one implementation, a structure is disclosed that enhances operating ergonomics for the operator. In particular, an agricultural working machine is disclosed that includes a seat on which an operator of the agricultural working machine can sit, a monitor configured to display operating data related to operation of at least one aspect of the agricultural machine (e.g., operating data of the agricultural working machine and/or of an attachment to the agricultural working machine, and an adjustable holding device configured to hold the monitor and to adjust the height, tilt and distance of the monitor relative to the seat.

In this way, using an adjustable holding device that holds the monitor and allows the height, tilt and distance of the monitor to be adjusted relative to the seat, an operating unit can be created that satisfies the requirements with regard to any one, any combination or all of: ergonomics; braking; driving; vision; and glare.

In one implementation, the monitor comprises a touchscreen monitor. With the monitor, one or more aspects of the operator's interaction with the operating data of the monitor may be improved. For example, the display of the operating data of the agricultural working machine and/or an attachment can be displayed. In addition, adjustment and/or retrieval of the operating data, such as operating parameters of the agricultural working machine and/or of the attachment, may be easier and more flexible.

In one implementation, the monitor may be adjusted from a first position to a second position, with the second position being different in height from the first position and in which the monitor is shifted parallel to the first position. In another implementation, the holding device includes a linear unit through which the height of the monitor can be adjusted in a translatory or translational manner along a linear axis. In a specific implementation, the linear unit includes a lever for locking and unlocking the linear unit.

In one implementation, the holding device includes a first pivoting joint for pivoting the monitor about a substantially vertical pivot axis. Alternatively, or in addition, the holding device includes a second pivoting joint for pivoting the monitor about a substantially horizontal pivot axis.

In one implementation, the holding device has a ball joint for adjusting the tilt of the monitor relative to the seat. In a specific implementation, at least one of the pivoting joints and/or the ball joint holds the monitor in its position relative to the seat in a friction lock while the agricultural working machine is operating, and it is adjustable without removing adjusting elements. The friction in the at least one of the pivoting joints and/or the ball joint can be respectively adjusted by an adjusting element. Further, the holding device can be single-handedly adjustable (e.g., adjusted with the use of only a single hand).

These structures thus enable to more easily adapt the monitor to the operating situation for the operator, such as to pivot the monitor out of the field of vision of the operator toward the working units and/or the crop.

In one implementation, the seat has a damping element configured to cushion and/or to reduce bouncing of the seat due to ground unevenness. The holding device may be fastened to the seat vertically above the damping element. In particular, the seat may have a fixed part and an adjustable part vertically above it, with the adjustable part being adjustable on adjusting rails, wherein the first pivoting joint is positioned in the region of the adjusting rails on the fixed part, or positioned on the adjustable part of the seat.

In one implementation, the seat has an armrest, and the holding device is fastened to the armrest. Alternatively or in addition, the seat has an armrest, and the armrest is horizontally and/or vertically adjustable, and the monitor is adjustable separate from the armrest. In this way, the interaction of the seat and the holding device may further enhance ergonomics of the agricultural working machine.

Referring to the figures, FIG. 1 shows an agricultural working machine 1. Various types of agricultural machines are contemplated. One example, agricultural machine is a harvesting machine, such as a combine, is disclosed in the figures. Thus, any discussion regarding the harvesting machine depicted in the figures may be applied to other types of agricultural machines. For example, the agricultural working machine 1 may comprise a forage harvester and/or an agricultural prime mover such as a tractor.

In one implementation, the agricultural working machine 1 includes a cab 2. A workplace 3 for an operator 4, such as the driver in this case, of the agricultural working machine 1 is positioned in the cab 2.

A part of the agricultural working machine 1 has a seat 5 for an operator 4 of the agricultural working machine 1. For example, the cab 2 may house the seat 5 for the operator 4. In this case, the seat 5 may be fastened to the floor B of the cab 2. Furthermore, a monitor 6 is provided to display operating data related to one or more aspects of the agricultural working machine 1, such as operating data related to a working unit 7 of the agricultural working machine 1, and/or operating data related to an attachment of the agricultural working machine 1. The operating data can for example be operating parameters of a working unit 7 of the agricultural working machine 1, and/or an attachment of the agricultural working machine 1. For example, the operating data may be operating parameters of a cutting system 7a, a threshing system 7b, a cleaning device 7c, etc. In one implementation, the monitor 6 has an LCD display and/or an OLED display.

The monitor 6 is held by an adjustable holding device 8. By adjusting the holding device 8, the height H, tilt N and distance A of the monitor 6 may be adjusted relative to the seat 5. This allows the position and alignment of the monitor 6 to be adapted for various reasons, including any one, any combination, or all of: adjusting to different light conditions to keep the operator 4 from being blinded; adapting the position and alignment of the monitor 6 to the ergonomic requirements of the operator 4 and the task to be performed by operator; adapting for the visibility requirement of the operator.

In addition, the agricultural working machine 1 may operate in different contexts, such as on roads and off-road (such as on fields and/or in a forest where the ground unevenness is significantly greater than on roads). The disclosed holding device 8 may hold its position during driving maneuvers in the various contexts, such on roads and off-road. In this way, information relating to driving and braking requirements of the agricultural working machine 1 may be displayed on the monitor 6. Thus, regardless of context, but particularly in the off-road context, the holding device 8 may provide stability and strength for positioning the monitor.

Given the adjustability of the monitor 6 relative to the seat 5, the monitor may be adapted easily and flexibly to different work situations. It is thus contemplated, for example, for the operator 4 to pivot the monitor 6 away from himself/herself and/or to pull the monitor toward himself/herself for the task to be performed in order to adjust the working unit 7 thereto. The operator may then pivot the monitor out of his/her direct field of vision in order to have free visibility through the window 9 of the cab 2 of the crop 10, the working units 7, and/or attachments. In one implementation, the monitor 6 may be pivoted to the side such that it frees the view of the operator 4 sitting on the seat 5 of the cutting unit 7a, or the view of the stubble in front of the agricultural working machine 1.

In one implementation, the monitor 6 is designed as a touchscreen monitor. Operating data, such as operating parameters of one or more aspects of the agricultural working machine 1 (e.g., aspect(s) of the working units 7 of the agricultural working machine 1 and/or aspects of an attachment of the agricultural working machine 1), may be adjusted and/or retrieved thereby. In an implementation where the agricultural working machine 1 includes a camera 11, the video data of the camera 11 may additionally or alternatively be retrieved. Such a camera 11 may for example be positioned on or in the grain tank 12 to monitor the level thereof, and/or the quality of the grain therein, and/or on the transfer pipe 13 to monitor a transfer process. Alternatively or in addition, the camera 11 or one of the cameras 11 may be a rear-view camera 11a, for example.

In one implementation, the monitor 6 simultaneously shows both the camera image and operating parameters, through which the process shown in the camera image may be affected. In an implementation with a touchscreen monitor, the operating parameters may be easily adapted as necessary.

To enable the access, adjustment and/or retrieval of the operating parameters, the monitor 6 is in electronic communication (e.g., has a data link) with another electronic device, such as a main computer 14 of the agricultural working machine 1.

The height of the monitor 6 may be adjusted, such as from a first position into a second position, where the second position has a different height than the first position and/or in which the monitor 6 is shifted in the second position parallel to the first position (e.g., the monitor moves from a first plane to a second plane parallel to the first plane). This is portrayed with dot-dashed lines in FIG. 2. In this case, the monitor 6 is not only shifted in parallel, but also is shifted in a plane.

Figure 2:
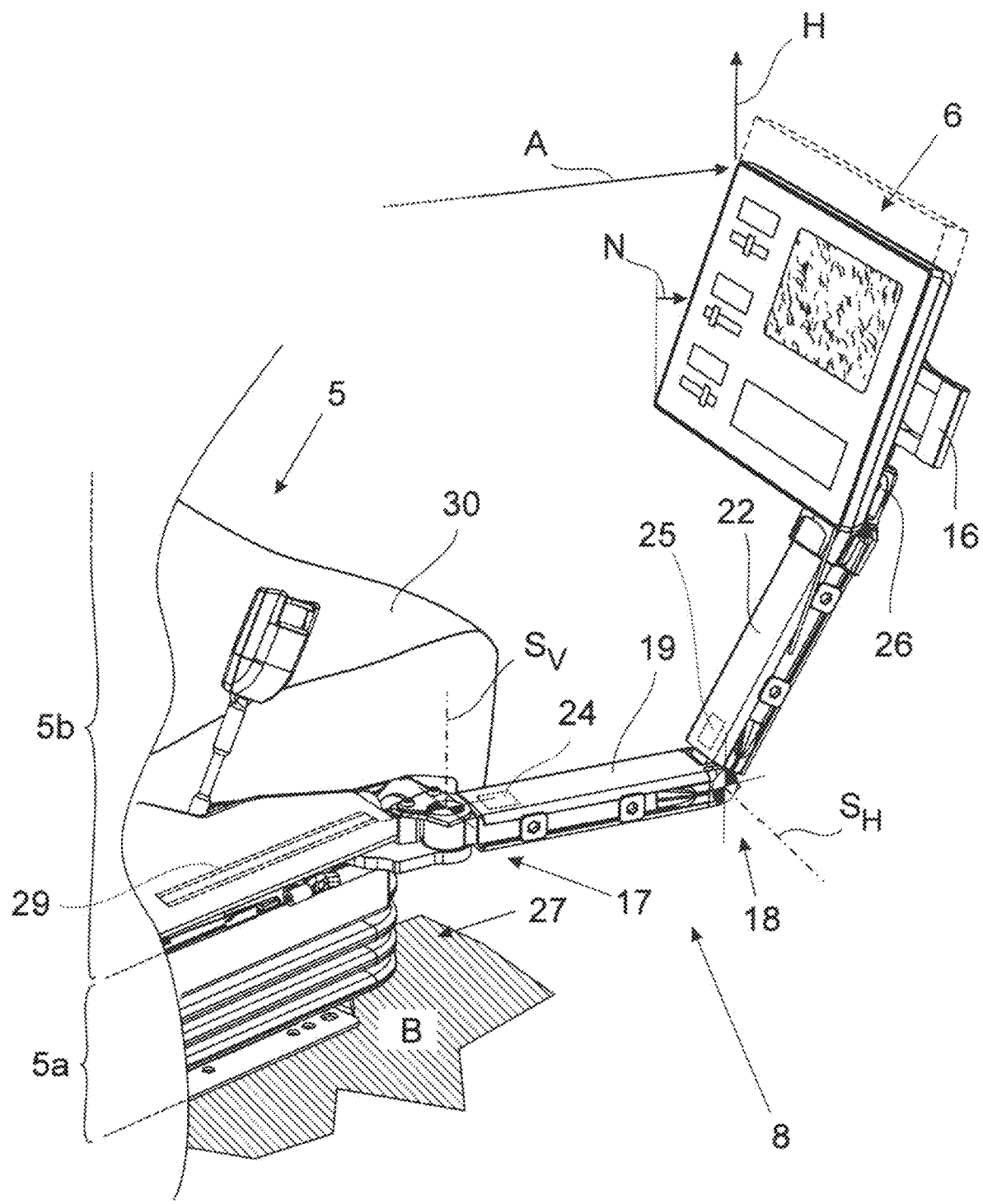
FIG. 2 illustrates a schematic perspective view of a seat with the holding device and monitor.

In this regard, the holding device 8 has a linear unit 15 which may be used to adjust the height of the monitor 6 (such as illustrated in FIG. 2) in a translatory or translational manner along a linear axis L. The linear unit 15 may have two guide rails 15a, 15b that guide the adjusting movement of the monitor 6 along the linear axis L. The monitor 6 may be mounted on springs of the linear unit 15 that reduce or decelerate movement of the monitor 6 and/or support the adjusting movement of the monitor 6.

Figure 3:
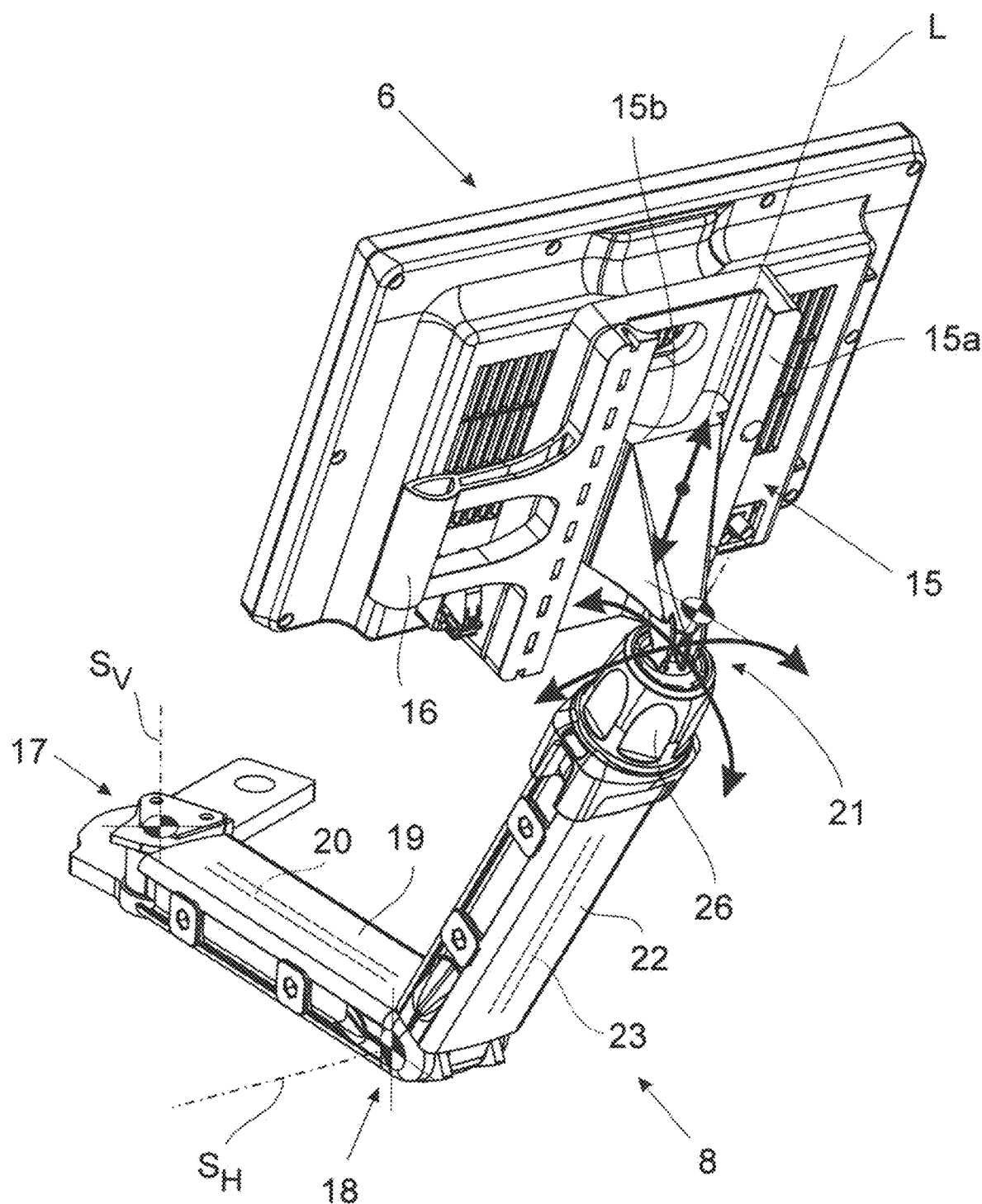
FIG. 3 illustrates another schematic perspective view of the holding device and monitor.

The holding device 8 may comprise one or more kinematic adjusting elements. In one implementation, the linear unit 15 comprises the last kinematic adjusting element of the holding device 8, when viewed starting from the end of the holding device 8 facing away from the monitor 6, e.g., distance from the monitor 6. This is illustrated in FIG. 3. In this regard, holding device 8 is the kinematic adjusting element closest to monitor 6. In this implementation, the linear unit 15 has a lever 16 for locking and unlocking the linear unit 15. This reduces or prevents the monitor 6 from being displaced by the vibrations during the operation of the agricultural working machine 1. If desired, the monitor 6 may be easily adjusted at the same time, such as with one hand, by unlocking, adjusting and then locking using the lever 16. The lever may be placed on a side, such as clutchable by the operator 4 behind one side of the monitor 6, such as behind a right side of the monitor 6. In this way, the operator 4 may single-handedly operate the lever 16. Further, by locking with the lever 16, the effect of the springs of the linear unit 15 may be canceled or nullified. Specifically, in one implementation, the springs may only act to brake and/or support when the linear unit 15 is unlocked.

As shown in FIG. 2, the holding device 8 may have a first pivoting joint 17 at the end facing away from the monitor, with the first pivoting joint 17 for pivoting the monitor 6 about a substantially vertical pivot axis SV. In other words, first pivoting joint 17 allows a swinging movement of the holding device such that the support arm 19 (e.g., a rigid support arm) moves in a plane substantially parallel to the plane of the seat surface of seat 5. As discussed in more detail below, first pivoting joint 17 may be moved forward and/or backward relative to the seat via adjusting rails 29. Alternatively or in addition, the monitor 6 may be pivoted in the direction of travel R substantially in front of the seat 5. In such a position, it is convenient to enter and/or retrieve the operating parameters of the working unit 7 and/or attachments. In particular, operating parameters for a pending harvesting process may be entered very easily in this position. While harvesting, the operator may seek to have a good and unobstructed view of the harvesting aggregate, such as the cutting system 7a. Consequently, the holding device 8 may be pivoted laterally to the direction of travel R. This results in the operator have a view of the harvesting aggregate, such as the cutting system 7a. In one implementation, the holding device 8 may be pivoted to the side between 45° and 90° relative to the direction of travel R.

In one implementation, the holding device 8 may have a second pivoting joint 18 for pivoting the monitor 6 about a substantially horizontal pivot axis SH. Thus, second pivoting joint 18 may act like an elbow, rotating about substantially horizontal pivot axis SH, with support arm 22 (such as a rigid support arm) acting as a forearm. In this manner, the distance of the monitor 6 to the operator 4 may be adjusted in an easy and way. In a specific implementation, proceeding from the end facing away from the monitor, the second pivoting joint 18 is positioned behind the first pivoting joint 17. A support arm 19, such as a rod-shaped support arm, is positioned between the two pivoting joints 17, 18. Alternatively or in addition, the support arm 19 may have a cable channel 20 for running a cable, such as from the seat 5, to the monitor 6.

As illustrated in FIG. 3, the holding device 8 furthermore has a ball joint 21 for adjusting the tilt of the monitor 6 relative to the seat 5. In this implementation, the ball joint 21 has multiple degrees of freedom, such as three degrees of freedom. Thus, the ball joint 21 allows the monitor 6 to be rotated and the monitor to be tilted in two directions. This is illustrated in FIG. 3. Between the ball joint 21 and the second pivoting joint 18, a support arm 22, such as a rod-shaped support arm, is provided. Support arm 22 also has a cable channel 23 for running a cable, such as from the seat 5 to the monitor 6.

In this implementation, the necessary adjusting force of the first pivoting joint 17, and/or the second pivoting joint 18, and/or the ball joint 21 may be respectively adjusted by a respective adjusting element 24, 25, 26. This enables adaption of the force to overcome in order to adjust the monitor 6 depending on the vibration and/or acceleration that arises while operating the agricultural working machine 1 from driving, turning or braking maneuvers. Any one, any combination, or all of the first pivoting joint 17, the second pivoting joint, and the ball joint 21 may hold the monitor 6 in its position relative to the seat 5 while operating the agricultural working machine 1. As one example, both of the first pivoting joint 17 and the second pivoting joint 18 may hold the monitor 6 in its position relative to the seat 5 while operating the agricultural working machine 1. As another example, both of the first pivoting joint 17, the second pivoting joint 18, and the ball joint 21 may hold the monitor 6 in its position relative to the seat 5 while operating the agricultural working machine 1. Any one, any combination, or all of the first pivoting joint 17, the second pivoting joint and the ball joint 21 may be adjusted individually or in combination without removing adjusting elements, such as clamping screws. In one implementation, the holding device 8 may be adjusted single-handedly.

As shown in FIG. 2, the seat 5 has a damping element 27 for cushioning ground unevenness. In this implementation, the damping element may be provided in addition to a suspension 28, which may cushion the cab 2 against ground unevenness. As can also be seen in FIG. 2, the holding device 8 is fastened to the seat 5 vertically above the damping element 27. Thus, in this configuration, damping element 27 may dampen vibrations that are transmitted to an operator 4 sitting in the seat 5 as well as dampen vibrations to the monitor 6. For example, particularly high vibration frequencies, which may originate from the working units 7 or the motor of the agricultural working machine 1, may be effectively filtered out. The operator 4 and the monitor 6 may then move within a common reference system. In particular, due to this commonality, the disclosed configuration facilitates entry on the touchscreen monitor since vibrations are transmitted in the same manner both to the operator 4 as well as to the monitor 6. Consequently, these have a significantly attenuated effect than if the monitor 6 were attached to the cab 2, for example.

The seat 5 furthermore has a fixed part 5a and an adjustable part 5b vertically above it (e.g., vertically with reference to the floor of the cab). The adjustable part 5b may be adjustable, such as adjustable on one or more horizontal adjusting rails 29. The one or more horizontal adjusting rails 29 allow a depth adjustment of the seat surface 30 to allow the distance to a pedal cluster 31 and/or a steering wheel 32 of the agricultural working machine 1. In this manner, the workplace 3 can be adjusted to operators 4 of different size. In one implementation, the first pivoting joint 17 is arranged or positioned in the region of the adjusting rails 29 on the fixed part 5a, or on the adjustable part 5b of the seat 5. In this implementation, "in the region" may mean that the first pivoting joint 17 is arranged at a distance to the adjusting rails 29 of a first example at a maximum of 20 cm, of a second example at a maximum of 10 cm, or of a third example at preferably a maximum of 5 cm. This enables a particularly ergonomic arrangement of the first pivoting joint 17 in the proximity of the seat surface 30. The monitor 6 may thereby be pivoted on the first pivoting joint 17 substantially without a change in distance to the operator 4. Consequently, a readjustment of the monitor 6, apart from the pivoting itself, is not required by the operator 4 after pivoting.

In this implementation, the seat 5 may further include an armrest 33. The armrest 33 may have control elements 34 for adjusting and retrieving operating parameters of the agricultural working machine 1 and/or an attachment. The control elements 34 may, for example, comprise a joystick and/or switch element. Alternatively, the holding device 8 is fastened to the armrest 33. This implementation yields a particularly ergonomic arrangement of the monitor 6.

The armrest 33 may be adjustable horizontally and/or vertically. In one implementation, the monitor 6 is adjustable separate from the armrest 33, and the armrest 33 also may be adjustable separate from the monitor 6.

REFERENCE NUMBER LIST

1 Agricultural working machine
2 Cab
3 Workplace
4 Operator
5 Seat
5a Fixed part
5b Adjustable part
6 Monitor
7 Working unit
7a Cutting system
7b Threshing system
7c Cleaning device
8 Holding device
9 Window
10 Crop
11 Camera
11a Rear view camera
12 Grain tank
13 Transfer pipe
14 Main computer
15 Linear unit
15a Guide rail
15b Guide rail
16 Lever
17 First pivoting joint
18 Second pivoting joint
19 Support arm
20 Cable channel
21 Ball joint
22 Support arm
23 Cable channel
24 Adjusting element
25 Adjusting element
26 Adjusting element
27 Damping element
28 Cab suspension
29 Adjusting rails
30 Seat surface
31 Pedal cluster
32 Steering wheel
33 Armrest
34 Control elements
A Distance
B Ground
H Height
L Linear axis
N Tilt
R Direction of travel
SV Vertical pivot axis
SH Horizontal pivot axis It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. An agricultural working machine comprising:
   a seat for an operator of the agricultural working machine;
   a monitor configured to display operating data of the agricultural working machine or of an attachment of the agricultural working machine; and
   an adjustable holding device configured to hold the monitor and adjust height, tilt and distance of the monitor relative to the seat;
   wherein the holding device includes a first pivoting joint for pivoting the monitor relative to the seat about a substantially vertical pivot axis;
   wherein the holding device includes a second pivoting joint for pivoting the monitor about a substantially horizontal pivot axis; and
   wherein the holding device includes a linear unit for adjusting height of the monitor translationally along a linear axis so that the monitor is adjusted from a first position into a second position that differs in height from the first position and in which the monitor is displaced parallel to the first position.

2. The agricultural working machine of claim 1, wherein the monitor comprises a touchscreen monitor through which operating data of the agricultural working machine or an attachment of the agricultural working machine is adjusted or retrieved.

3. The agricultural working machine of claim 1, wherein the holding device is single-handedly adjustable.

4. The agricultural working machine of claim 1, wherein the seat includes a damping element configured to cushion ground unevenness; and
   wherein the holding device is fastened to the seat vertically above the damping element relative to a ground of the agricultural work machine.

5. The agricultural working machine of claim 1, wherein the seat has an armrest; and
   wherein the holding device is fastened to the armrest.

6. The agricultural working machine of claim 1, wherein the seat has an armrest;
   wherein the armrest is adjustable in at least one of horizontally or vertically; and
   wherein the monitor is adjustable separate from the armrest.

7. The agricultural working machine of claim 1, wherein the monitor is mounted on springs of the linear unit that reduce movement of the monitor.

8. The agricultural working machine of claim 1, wherein the holding device further comprises a ball joint configured to adjust the tilt of the monitor relative to the seat.

9. The agricultural working machine of claim 8, wherein at least one of the first pivoting joint, the second pivoting joint, or the ball joint is configured to hold the monitor in its position relative to the seat in a friction lock while the agricultural working machine is operating.

10. The agricultural working machine of claim 8, wherein each of the first pivoting joint, the second pivoting joint, and the ball joint has a respective adjusting element; and
    wherein each of the first pivoting joint, the second pivoting joint, and the ball joint is adjustable without removing the respective adjusting element.

11. The agricultural working machine of claim 8, wherein each of the first pivoting joint, the second pivoting joint, and the ball joint has a respective adjusting element; and
    wherein friction in at least one of the first pivoting joint, the second pivoting joint, or the ball joint is adjusted by the respective adjusting element.

12. An agricultural working machine comprising:
a seat for an operator of the agricultural working machine;
a monitor configured to display operating data of the agricultural working machine or of an attachment of the agricultural working machine; and
an adjustable holding device configured to hold the monitor and adjust height, tilt and distance of the monitor relative to the seat;
wherein the holding device is configured to adjust the monitor from a first position to a second position, the second position being different in height from the first position and shifted parallel to the first position; and
wherein the holding device comprises a linear unit, the linear unit configured to adjust the height of the monitor in a translatory manner along a linear axis.

13. The agricultural working machine of claim 12, wherein the linear unit includes a lever for locking and unlocking the linear unit; and
wherein the lever is configured for single-handed activation in order to unlock the linear unit.

14. An agricultural working machine comprising:
a seat for an operator of the agricultural working machine, wherein the seat has a fixed part and an adjustable part, the adjustable part positioned vertically, relative to a ground of the agricultural work machine, above the fixed part;
a monitor configured to display operating data of the agricultural working machine or of an attachment of the agricultural working machine; and
an adjustable holding device configured to hold the monitor and adjust height, tilt and distance of the monitor relative to the seat, wherein the holding device comprises a first pivoting joint configured to pivot the monitor, wherein the holding device comprises a first pivoting joint configured to pivot the monitor about a substantially vertical pivot axis;
wherein the adjustable part is adjustable on one or more adjusting rails; and
wherein the first pivoting joint is arranged in a region of the one or more adjusting rails on at least one of the fixed part or the adjustable part of the seat.

15. The agricultural working machine of claim 14, wherein the first pivoting joint is arranged in the region of the one or more adjusting rails on the adjustable part of the seat such that the first pivoting joint is configured to move forward and backward relative to the seat via the one or more adjusting rails.

16. The agricultural working machine of claim 15, wherein the holding device further comprises a second pivoting joint configured to pivot the monitor about a substantially horizontal pivot axis.

17. The agricultural working machine of claim 16, wherein the holding device further comprises a ball joint configured to adjust the tilt of the monitor relative to the seat.

18. The agricultural working machine of claim 17, wherein each of the first pivoting joint, the second pivoting joint, and the ball joint are configured to hold the monitor in its position relative to the seat in a friction lock while the agricultural working machine is operating.

\* \* \* \* \*